United States Patent
Norrga et al.

(10) Patent No.: US 10,903,642 B2
(45) Date of Patent: Jan. 26, 2021

(54) ARRANGEMENT, SYSTEM, AND METHOD OF INTERRUPTING CURRENT

(71) Applicant: SCIBREAK AB, Enköping (SE)

(72) Inventors: Staffan Norrga, Stockholm (SE);
Lennart Ängquist, Enköping (SE);
Tomas Modéer, Stockholm (SE)

(73) Assignee: SCIBREAK AB, Enköping (SE)

( * ) Notice: Subject to any disclaimer, the term of this patent is extended or adjusted under 35 U.S.C. 154(b) by 136 days.

(21) Appl. No.: 16/021,057

(22) Filed: Jun. 28, 2018

(65) Prior Publication Data

US 2019/0013662 A1    Jan. 10, 2019

Related U.S. Application Data

(63) Continuation of application No. PCT/SE2016/051233, filed on Dec. 8, 2016.

(30) Foreign Application Priority Data

Dec. 28, 2015    (SE) ...................................... 1551717

(51) Int. Cl.
*H02H 3/08*     (2006.01)
*H02H 3/02*     (2006.01)
(Continued)

(52) U.S. Cl.
CPC .............. *H02H 3/021* (2013.01); *H01H 9/54* (2013.01); *H01H 33/59* (2013.01);
(Continued)

(58) Field of Classification Search
USPC ....................................................... 361/2–13
See application file for complete search history.

(56) References Cited

U.S. PATENT DOCUMENTS 8,837,093 B2 *   9/2014   Panousis ................ H01H 33/75
                                                                    361/13
9,159,511 B2 *  10/2015   Kostovic .............. H01H 33/596
(Continued)

FOREIGN PATENT DOCUMENTS

DE    2039065 A1    2/1972
EP    1944779 A2    7/2008
(Continued)

*Primary Examiner* — Danny Nguyen
(74) *Attorney, Agent, or Firm* — Gabriela B. Tomescu, Esq.; Bergenstrahle & Partners AB

(57) ABSTRACT

An arrangement for interrupting current comprising a first and a second terminal adapted to electrically connect two sections of a power system is provided. A voltage control means is controllable in use to inject energy into said loop to force a rapid increase of an alternating current flowing through said main branch while being controlled to open to interrupt a main current, and whereby zero cross-over of the current through the mechanical main circuit breaker is realized as the amplitude of the alternating current exceeds the amplitude of the main current. An energy absorbing device is adapted to limit the voltage across said capacitor and said mechanical breaker when the mechanical breaker is open, and across an inductive element if the voltage across the mechanical breaker breaks down, at or immediately after an opening process, thereby limiting the rate-of-rise and the peak of the current through said loop.

30 Claims, 17 Drawing Sheets

(51) Int. Cl.
*H01H 33/59* (2006.01)
*H01H 9/54* (2006.01)
*H02H 3/087* (2006.01)

(52) U.S. Cl.
CPC ............ *H01H 33/596* (2013.01); *H02H 3/08* (2013.01); *H02H 3/087* (2013.01); *H01H 2009/543* (2013.01)

(56) References Cited

U.S. PATENT DOCUMENTS

| | | | | |
|---|---|---|---|---|
| 2013/0154774 A1* | 6/2013 | Bhavaraju | .............. | H01H 47/18 335/127 |
| 2015/0002977 A1* | 1/2015 | Dupraz | ................. | H01H 9/542 361/115 |
| 2016/0006236 A1* | 1/2016 | Tang | .................... | H01H 33/596 361/91.5 |

FOREIGN PATENT DOCUMENTS

| | | | |
|---|---|---|---|
| GB | 2178901 A | 2/1987 | |
| WO | 2014/166528 A1 | 10/2014 | |
| WO | 2015/062644 A1 | 5/2015 | |

* cited by examiner

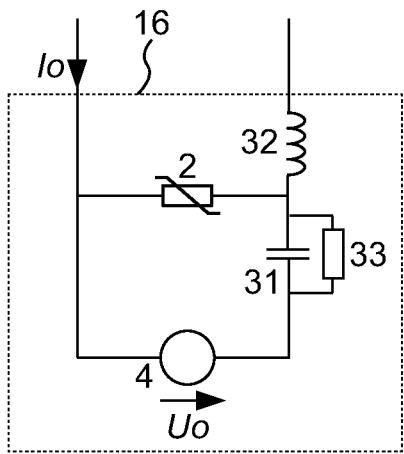 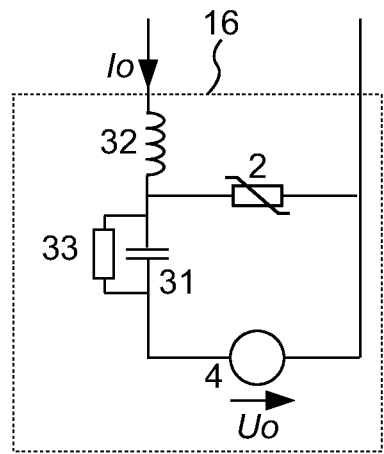
FIG. 18a    FIG. 18b
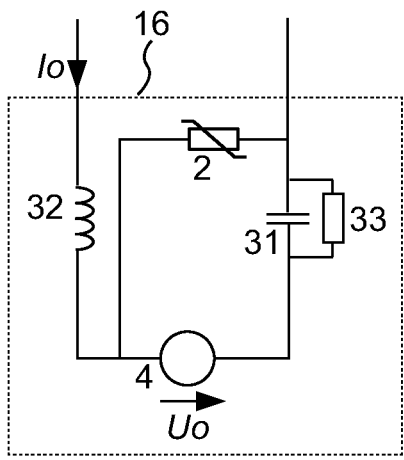
FIG. 18c
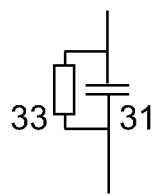 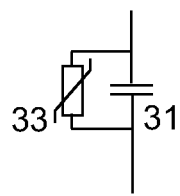 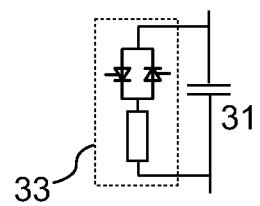
FIG. 19a    FIG. 19b    FIG. 19c

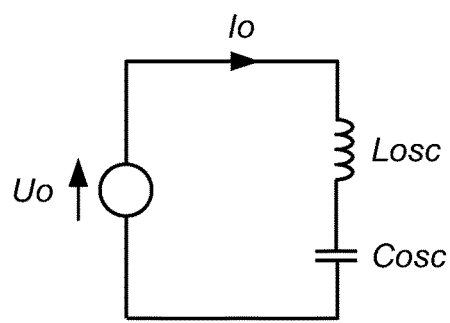 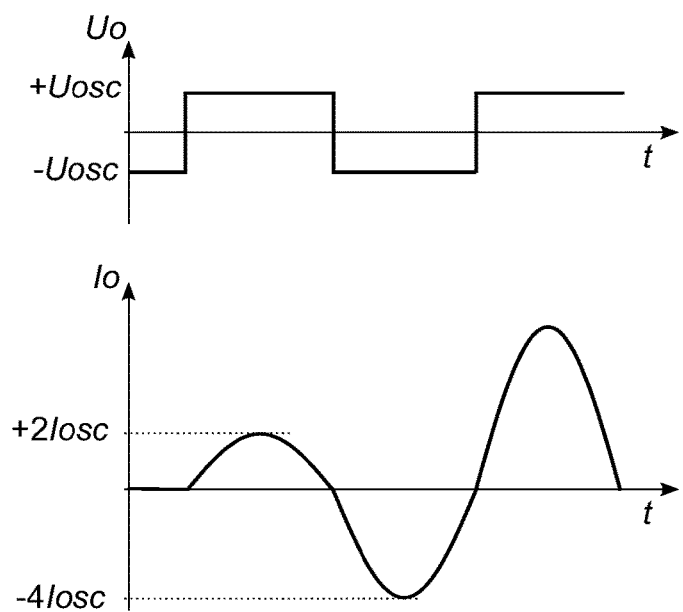
FIG. 25a
FIG. 25b

ARRANGEMENT, SYSTEM, AND METHOD OF INTERRUPTING CURRENT

This application is the continuation of International Application No. PCT/SE2016/051233, filed 8 Dec. 2016, which claims the benefit of Swedish Patent Application No. SE 1551717-0, filed 28 Dec. 2015, the entire contents of which are hereby incorporated by reference.

TECHNICAL FIELD

The present invention relates generally to interrupting current in power systems, and particularly relates to circuit breakers employing an added auxiliary oscillating current to interrupt the main current. The present invention also relates to a system and a method of interrupting current.

BACKGROUND ART

The use of circuit breakers or other current interruption means is well established in electrical systems in general, such as in electrical power distribution or transmission systems, especially as a means to protect, isolate and/or control the operation of different components in the power system particularly under fault conditions e.g. short circuit faults, or over-current conditions etc. Circuit breakers are also used to isolate parts of the power system during repairs and/or maintenance on specific components or sections of the power system. Furthermore, circuit breakers are frequently used to connect various loads, like motors or other industrial loads, to the network.

Different types of circuit breakers have been used as current interrupters depending on the current or voltage levels of the power system. Most commonly mechanical circuit breakers are used whereby the actuators, used to separate the contacts, may use motors, springs, pneumatic arrangements or some other means. Alternative current interrupters may use semiconductor devices.

Most applications require, not least for safety reasons, that the current interrupter realizes physical separation between the two sides of the circuit breaker and consequently there is a need for a mechanical switch even if a solid state current interrupter is used. Mechanical switches can also be used in parallel with solid state current interrupters in order to eliminate the losses in the semiconductor devices, which may be significant when used in high voltage applications requiring series connection of many devices in order to achieve the necessary voltage withstand capability.

When interrupting a current flowing in an electrical circuit by separation of mechanical contacts an arc is in general generated between the contacts. At high voltage it is necessary that the current flowing in the arc is forced to make a zero-crossing, naturally or by artificial means, in order to extinguish. In ac power systems, current zero is naturally occurring once every half cycle of the system frequency, and therefore the realization of simple arrangements for ac circuit breakers is quite common and well established. It is however desired in some applications to interrupt the current in an ac system at a much faster pace than the rate offered by the naturally occurring zero-crossing of the current in order to prevent the fault current from reaching high levels or to protect sensitive equipment.

Dc systems on the other hand, lack this natural zero-crossing of the current and consequently there has been many attempts to realize a fast dc breaker for interrupting fault current in dc power systems. This problem has been solved in the prior art by introducing a resonance circuit that superimposes an ac current onto the current to be interrupted to cause zero-crossing. In a PCT publication WO 2014/166528 A1, a dc circuit breaking arrangement is disclosed using a mechanical current interrupter in parallel with a resonance circuit that includes at least one capacitor, at least one inductor and at least one switch element. The resonance circuit is made to generate a resonance current superposing current of any arc generated in the current interrupter, by closing the switch element. This arrangement has the drawback that the oscillation current is basically excited by the arc voltage. To overcome this drawback, the disclosed arrangement is further provided with an auxiliary power supply unit that can if needed convey power to charge the capacitor. This arrangement requires an elaborate charging process and needs to be specifically adapted for each application.

U.S. Pat. No. 4,805,062 discloses a solution to the problem by using a charged capacitor to force a current zero. To do this it discloses a dc circuit breaker comprising a commutation capacitor with one end connected to the positive bus of a dc line and the other end to a negative bus of the dc line through a charging resistor, and a series circuit, including a magnetic repulsive coil and a second switch, connected in parallel to the commutation capacitor, in which the commutation capacitor is charged directly from the positive dc line. When the breaker unit starts to open, the second switch is turned on in order to reverse the polarity of the charged commutation capacitor so that it causes a reverse discharge current through the breaker unit simultaneously as the breaker unit opens. This invention has the drawback of very limited controllability and therefore it is difficult to achieve optimal switching behavior. Furthermore, the solution is less appropriate in high voltage applications, which present constraints on the proposed charging mechanism.

A circuit breaking arrangement adapted for direct current transmission line is disclosed in WO2014/154260 A1. The circuit breaker arrangement comprises a mechanical current interrupter unit adapted to, when actuated, interrupt current in the transmission line and two resonance circuits wherein each of the resonance circuit is adapted to, upon actuation of the current interrupter unit, to generate a resonance current superposing current of any arc generated in the current interrupter unit, and where the resonance current that has been generated by the first resonance circuit flows into the current interrupter unit from a different direction than the resonance current generated by the second resonance circuit. This proposed solution suffers the disadvantage of having two resonant circuits with added complexity of the control for the two switches that connects the resonant circuits.

In a paper by J. M. Anderson, J. J. Carroll, "Applicability of a Vacuum Interrupter as the Basic Switch Element in HVDC Breakers", IEEE Transactions on Power Apparatus and Systems, Vol. PAS-97, No. 5, September/October 1972, the authors describe experiments where a pre-charged capacitor was discharged through a vacuum interrupter carrying a load current, in order to create an artificial zero-crossing of the total current passing through the vacuum interrupter. It was shown that a vacuum interrupter has attractive properties, like fast extinguishing, and very fast build-up of dielectric isolating strength, for this application. The discharge was initiated by firing a controlled triggered gap, thereby limiting the duty of the arrangement to single-shot discharge operations.

It is well-known from literature, e.g. from "Late Breakdown Phenomena in Vacuum Interrupters" authored by M. Schlaug et al, XXIII$^{rd}$ Int. Symp. on Discharges and Electrical Insulation in Vacuum—Bucharest—2008, that the voltage withstand capability of a vacuum interrupter may break down, so called "late breakdown", when the voltage across the vacuum interrupter starts to increase shortly after current turn-off at a current zero-crossing. This phenomenon most often is caused by particle contamination of the breaking chamber. Voltage breakdown may occur several milliseconds after current turn-off, when the voltage across the vacuum interrupter has risen to a high value. The design of any arrangement for interrupting current based on vacuum interrupters must consider this phenomenon and adequate precautions should be applied.

Generally the source driving the current through the breaker has an inner inductance. This particularly is valid in power transmission applications. When current is interrupted the magnetic energy stored in the source inductance must be absorbed by the current interrupting arrangement. A Metal Oxide Varistor (MOV) often is used for this purpose as it simultaneously provides a voltage limiting function. It can be connected directly across the terminals of the mechanical main breaker as shown in the mentioned PCT publication WO 2014/166528 A1. However, this circuit topology has shown to be less useful in arrangements for current interruption, that shall effectively handle late voltage breakdown situations as described above.

Examples of prior art arrangements for interrupting current are shown in FIGS. 1-4.

SUMMARY OF INVENTION

An object of the present invention is to overcome the problems and drawbacks of the prior art and disclose an improved current interrupting capability regardless of the type of current to be interrupted. Specifically the invention has been designed such that it can successfully handle late voltage breakdown situations, so that a secure current interruption can be ensured.

According to a first aspect of the invention, this object is realized by an arrangement for interrupting current comprising a first and a second terminal being adapted to electrically connect two sections of a power system, and comprising at least a main branch containing a mechanical breaker through which a main current between the terminals can flow when the main circuit breaker is closed, and a two-pole, connected in parallel with said main branch, said two-pole comprising at least one two-pole branch containing a capacitor and an energy absorbing device, where the main branch and the two-pole together form a loop, that contains an inductance and a voltage control means, and wherein the loop exhibits at least one resonance frequency, wherein the arrangement is characterized in that said voltage control means being controllable in use to inject energy into said loop to force a rapid increase of an alternating current flowing through said main branch while it is being controlled to open to interrupt the main current, and whereby zero cross-over of the current through the mechanical main circuit breaker is realized as the amplitude of the alternating current exceeds the amplitude of the main current, and that said energy absorbing device is adapted to limit the voltage across said capacitor and across said mechanical breaker when the mechanical breaker is open, that said energy absorbing device is adapted to limit the voltage across said inductive element if the voltage across the mechanical breaker breaks down, at or immediately after an opening process, thereby limiting the rate-of-rise and the peak of the current through said loop.

In a preferred embodiment, the two-pole comprises a parallel-connection of at least two two-pole branches.

In a preferred embodiment, at least one two-pole branch comprises at least one capacitor, at least one inductor and one voltage control means, all connected in series, and additionally at least one energy absorbing voltage limiting device connected in parallel with said capacitor. Alternatively or additionally, at least one two-pole branch comprises at least one capacitor, at least one inductor and one voltage control means, all connected in series, and additionally at least one energy absorbing voltage limiting device connected in parallel with a series-connection of said capacitor and said voltage control means.

In a preferred embodiment, the terminals are connected to points where the main branch and the two-pole are joined on either side of the main breaker.

In a preferred embodiment, an over-voltage reducing circuit is provided connected between terminals of the mechanical breaker. The over-voltage reducing circuit is preferably a series-connection comprising at least one resistor and at least one capacitor.

In a preferred embodiment, at least one disconnecting switch is arranged in series connection with at least one of the first and second terminals, and being controllable in use to provide a physical separation of the two sections of a power system.

In a preferred embodiment, the at least one voltage control means is a static voltage source converter.

In a preferred embodiment, the capacitor is provided with a discharging means.

In a preferred embodiment, the mechanical breaker comprises a contact adapted to move during the opening process of the mechanical breaker, and wherein the mechanical breaker comprises at least one sensor. The at least one sensor is preferably adapted in use to determine at least one of the position, the acceleration and the velocity of the contact during the opening process of the mechanical breaker. Furthermore said at least one sensor is adapted preferably to detect a physical quantity, preferably at least one of appearance of arcing voltage drop, acoustical phenomena and electromagnetic radiation or noise, such as optical, thermal, or X-ray radiation.

In a preferred embodiment, the at least one two-pole branch comprises additional passive components, which makes the loop exhibit several resonance frequencies.

In a preferred embodiment, the two-pole comprises a plurality of two-pole branches with different resonance frequencies, whereby the loop exhibits several resonance frequencies.

In a preferred embodiment, the main branch further comprises a saturable reactor arranged in series with the mechanical breaker to help reduce the rate of change of current in the proximity of the zero cross-over of the current through the mechanical breaker.

In a preferred embodiment, an additional circuit branch is arranged in parallel with the main branch, and the two-pole, said additional circuit branch being provided with a reverse current control means to, during a current interruption, provide an alternative path for reverse current away from the mechanical breaker. The reverse current control means preferably comprises two thyristors arranged in anti-parallel to control current flow through said two thyristors in opposite directions. Furthermore, the main branch preferably comprises a low-voltage semiconductor switch arranged in series with the mechanical breaker, the low-voltage semiconductor being controllable in use to help divert the current from the mechanical breaker to the additional circuit branch.

In a preferred embodiment, the arrangement for interrupting current is a dc breaker. Alternatively, the arrangement for interrupting current is a current limiting ac breaker.

According to a second aspect of the invention, a system for interrupting current is provided comprising at least two arrangements for interrupting current according to the invention, wherein said at least two arrangements for interrupting current are connected in series.

According to a third aspect of the invention, a method of interrupting current in a power system is provided using an arrangement for interrupting current according to the invention, the method comprising the steps of: opening the mechanical breaker to facilitate the separation of the contacts of the mechanical breaker and to interrupt a main current having an amplitude, and controlling the voltage control means in the two-pole to excite a total oscillating current having a maximum amplitude higher than the amplitude of the interrupted main current, to cause current zero-crossing in the main branch.

In a preferred embodiment, the waveform of the exciting voltage control means is designed, with respect to the filter characteristic of the loop, to provide an oscillating current having desired waveform to cause current zero-crossing in the branch containing the breaker.

In a preferred embodiment, the number of two-pole branches, their resonance frequencies and their respective starting time are selected in order to provide a total oscillating current with desired waveform to cause current zero-crossing in the branch containing the breaker.

In a preferred embodiment, the steps of opening the mechanical circuit breaker and controlling the voltage control means are performed concurrently and in coordination.

In a preferred embodiment, the sequence of the execution of the steps is predefined such that the zero-crossings in the current passing through the mechanical breaker occur at suitable time instants with respect to the dielectric isolation strength that is built up in the breaker, when the contacts separate from each other.

In a preferred embodiment, the sequence of steps is executed with predefined time delays between the consecutive steps, and wherein the time delays are fixed or varied dependent on the amplitude of the main current to be interrupted.

In a preferred embodiment, the predefined time delays between consecutive steps are selected so that the contact separation distance of the mechanical breaker is sufficient to withstand the voltage limit of the energy absorbing device of the second parallel branch in a minimum total time.

In a preferred embodiment, a sensor is used to determine the time delays between the steps.

In a preferred embodiment, the execution of one or several of the steps is conditional, so that an oscillating current, which has such amplitude that zero-crossings occur in the current flowing through the mechanical interrupter, is excited and maintained, until a decision is taken, either to execute the complete sequence of steps to interrupt the main current, or not to complete the interruption, in which case the oscillating current will be suppressed.

BRIEF DESCRIPTION OF DRAWINGS

The invention is now described, by way of example, with reference to the accompanying drawings, in which:

FIGS. 18a-c show different configurations of a branch comprising a capacitor, an inductor, a voltage control means and an energy absorbing device, where the capacitor is equipped by a discharging means;

FIGS. 19a-c show different means for discharging a capacitor;

FIGS. 25a-b show the principle of buildup of oscillating current amplitude in a resonant circuit;

DESCRIPTION OF EMBODIMENTS

In the following, a detailed description of an arrangement, a system, and a method for interrupting current according to the invention will be given.

Figure 1:
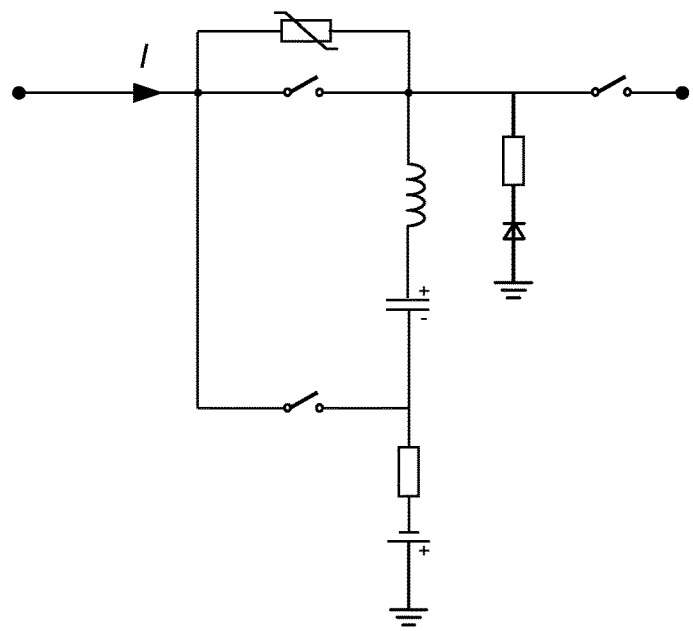
FIGS. 1-4 show prior art arrangements for interrupting current.
Figure 2:
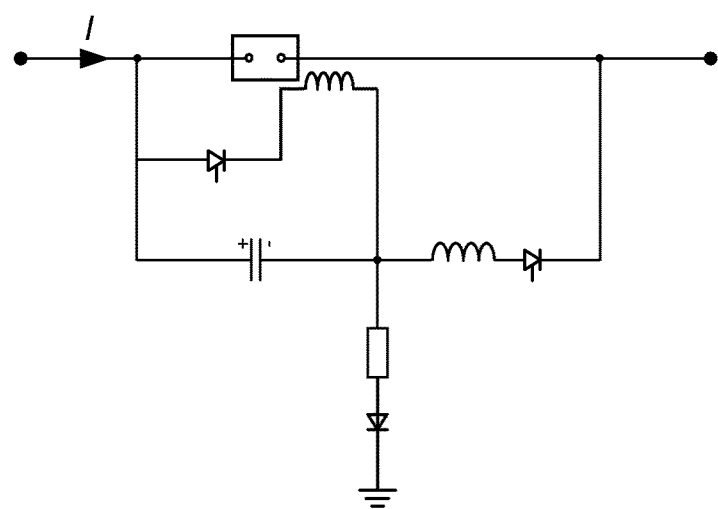
Figure 3:
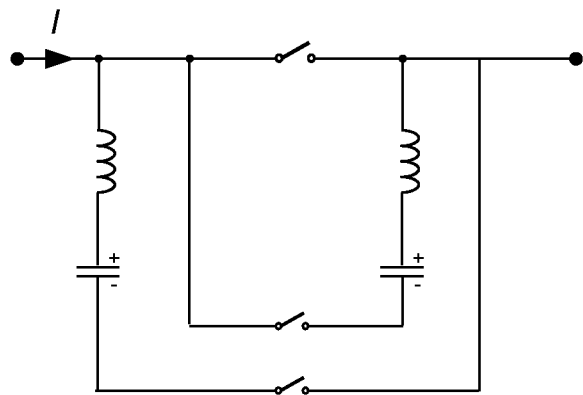
Figure 4:
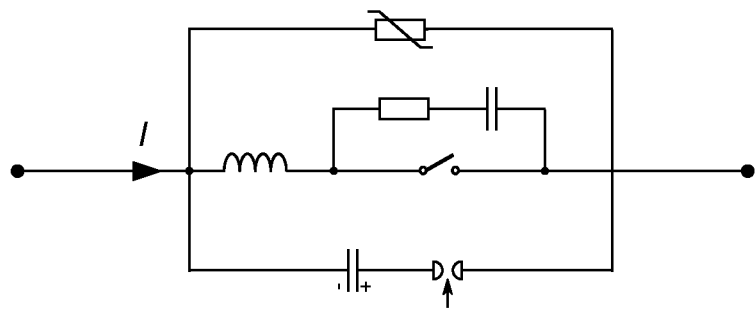
Figure 5:
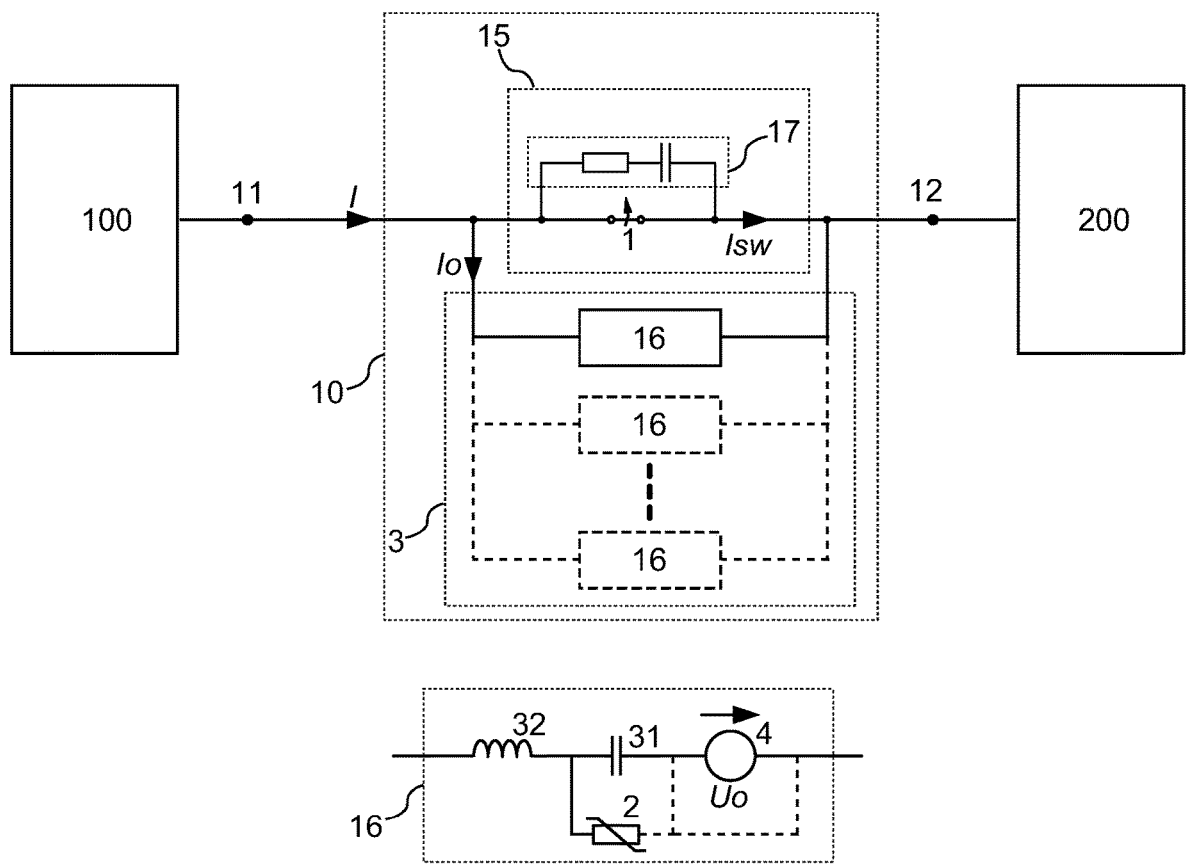
FIG. 5 shows a diagram of a general embodiment of an arrangement for interrupting current according to the invention.
Figure 6:
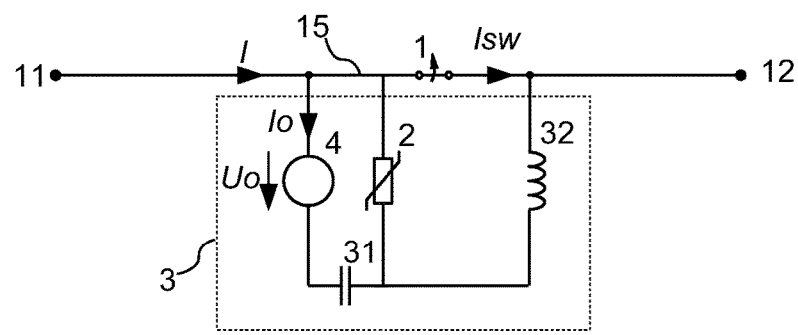
FIGS. 6-12 show various embodiments of the arrangement for interrupting current according to the invention.
Figure 7:
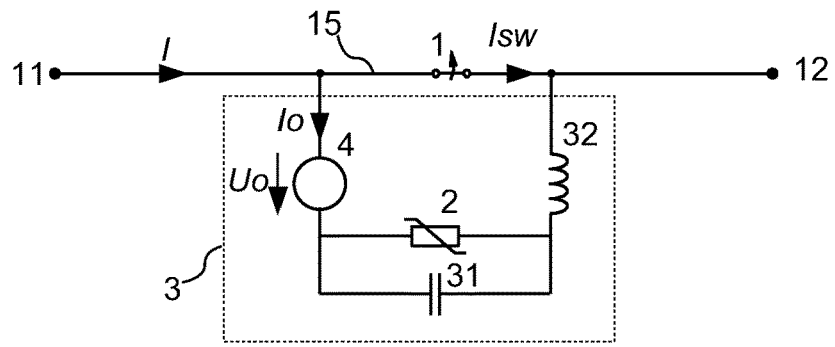
Figure 8:
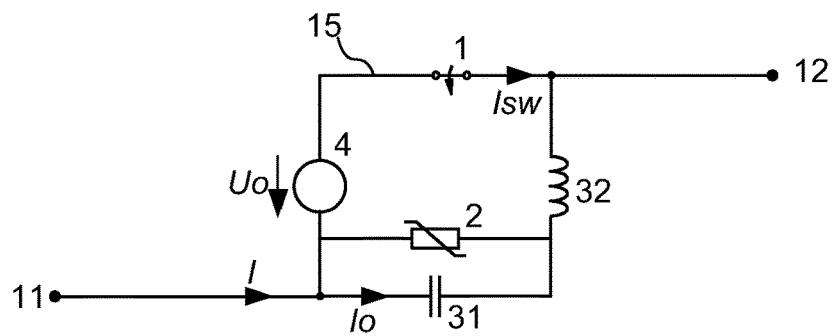
Figure 9:
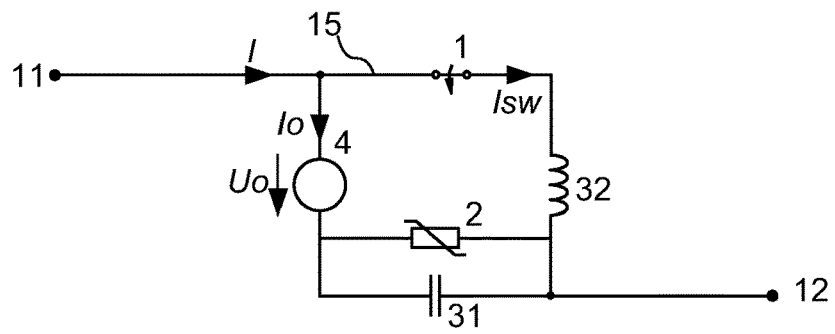
Figure 10:
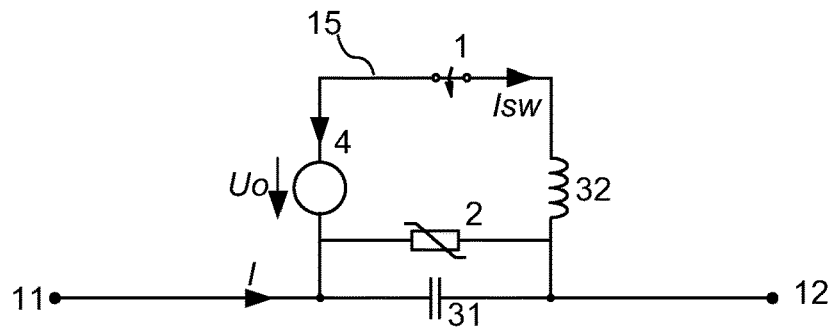

FIG. 5 shows an overview of the circuit related to the invention. The electrical connection between sections 100, 200 in a power system serves the purpose of transferring electrical power between said sections, in which case a main current I flows through the mechanical breaker 1. The sections 100, 200 may be subsystems of a common power system or separate electrical power transmission systems using dc or ac. Alternatively, the sections may represent an electrical power system feeding a load, e.g. a motor 200 connected to a power source 100.

At contact separation in the mechanical breaker 1 an internal arc will be established between the contacts and the main current I will continue to flow through the arc. If the mechanical switch operates at high voltage, the arc will only extinguish if a current zero cross-over, natural or forced by artificial means, occurs.

Figure 13:
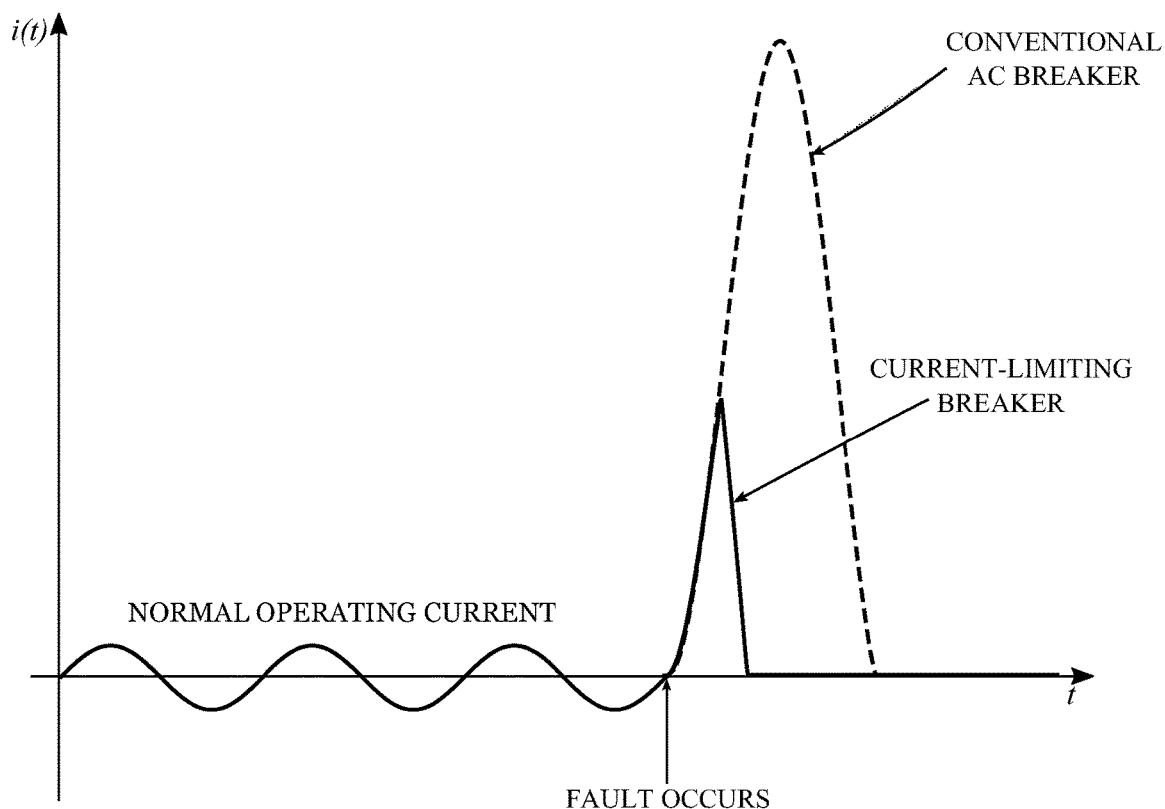
FIG. 13 shows a time diagram of current-limiting breaking.

In ac systems the main current I has natural zero-crossings and the arc will be extinguished at such a zero-crossing, as soon as the contact separation is sufficient to present a voltage withstand capability that exceeds the voltage appearing after current extinction. At short-circuits the current typically first increases towards a very high peak value before it approaches any zero cross-over. It may then be desired to perform an instantaneous interruption before the current has reached its peak value without awaiting the zero-crossing. This approach, known as current-limiting breaking of the main current, is elucidated in FIG. 13.

When the power transmission system utilizes direct voltage, like in high-voltage direct current (HVDC) systems, the current does not exhibit any natural zero-crossings. The current rather rises towards a very high value at faults in any or both of the interconnected systems 100, 200. Fast intervention of a current interrupting system then is required in order to prevent a total collapse of the interconnected power system.

From a breaker perspective the instantaneous, current-limiting breaking in an ac system is equivalent to interrupting direct current in a dc system because in both cases it is desired to interrupt the current through the mechanical switch 1 in absence of any natural zero-crossing.

The purpose of the invention is to provide an apparatus and a method to create an artificial current zero-crossing in a mechanical breaker carrying the main current I flowing between the electrical nodes 11,12 making it possible for the mechanical breaker to interrupt the current.

The general form of the invention in claim 1 is outlined in FIG. 5, where two electrical nodes 11,12 in a power system are adapted to electrically connect the two sections 100,200 of the power system through an arrangement 10 comprising one main branch 15, containing a mechanical main breaker 1, through which current between the terminals 11,12 can flow, and a two-pole 3, connected in parallel with said branch 15 containing at least one capacitor 31 and at least one energy absorbing device 2, where the branch 15 and the two-pole 3 together form a loop, that further contains at least one inductance 32 and at least one voltage control means 4, wherein the main branch 15 and the two-pole together exhibit at least one resonance frequency. Preferably the devices of the two-pole 3 are arranged in one or several branches 16 as indicated in the figure.

In a preferred embodiment a voltage limiting circuit, a so-called "snubber" 17, is connected in parallel across the terminals of the mechanical main breaker. Typically, the voltage limiting circuit comprises a series connection of a resistor and a capacitor, but other designs are conceivable and have been established in the field of power electronics.

FIGS. 6-10 depict different embodiments for implementing the arrangement 10. These differ in terms of the placement of the energy absorbing device 2, and in terms of the of the way the two electrical nodes 11,12 in a power system are connected to the arrangement 10.

The voltage control means is controllable in use to inject energy into said loop to force a rapid increase of an alternating current Io flowing through said branch 15 containing the mechanical main circuit breaker 1 while it is being controlled to open to interrupt a main current I, and whereby zero cross-over of the current Isw through the mechanical main circuit breaker 1 is realized as the amplitude AIo of the alternating current Io exceeds the amplitude AI of the main current I. Furthermore, the energy absorbing device 2 in the two-pole 3 is adapted to limit the voltage across said capacitor 31 and across the mechanical main breaker 1 when the latter is open (non-conducting) and to limit the voltage across the inductive element 32 in the loop constituted by the branch 15 and the two-pole 3, if the voltage across the mechanical main circuit breaker 1 breaks down, at or immediately after an opening process, thereby limiting the rate-of-rise and the peak of the current through said loop.

The main current I will temporarily be transferred into the two-pole 3, once the current Isw through the mechanical switch 1 has been extinguished at its zero cross-over. First, it flows in the capacitor 32, and thereafter it will commutate into the energy absorbing device 2. The protective voltage of device 2 must exceed the highest driving voltage in the inter-connected sections 100, 200, in order to eliminate the main current I.

The voltage control means 4 is controlled to inject energy into the resonant circuit(s) containing the capacitor(s) 31 and the inductor(s) 32 in order to force a rapid increase of an alternating current Io contributing to the current Isw through the mechanical breaker. In a first control approach for the voltage control means 4, positive feedback of measured current is exploited. The voltage control means 4 then appears like an artificial negative resistance inserted in the circuit. The value of the negative resistance can be deliberately selected by design. In a second control approach to excite current in said loop by injecting energy, the voltage control means 4 is controlled to produce an output voltage with a frequency close to the resonance frequency. The frequency may be varied in order to control the rate of rise of the amplitude AIo of the oscillating current Io. Other control methods for the oscillating current Io may be used. Moreover, due to the use of a controllable voltage control means 4, the energy injection into the loop, constituted by the branch 15, containing the breaker 1, and the two-pole 3, can be initiated before contact separation in the breaker 1 has occurred.

In a preferred embodiment further excitation of oscillating current is inhibited when the current Isw has ceased to flow in the breaker 1.

In a preferred embodiment the status of the conduction state of the breaker 1 is being monitored and excitation of the oscillating current resumes if reignition occurs.

Figure 11:
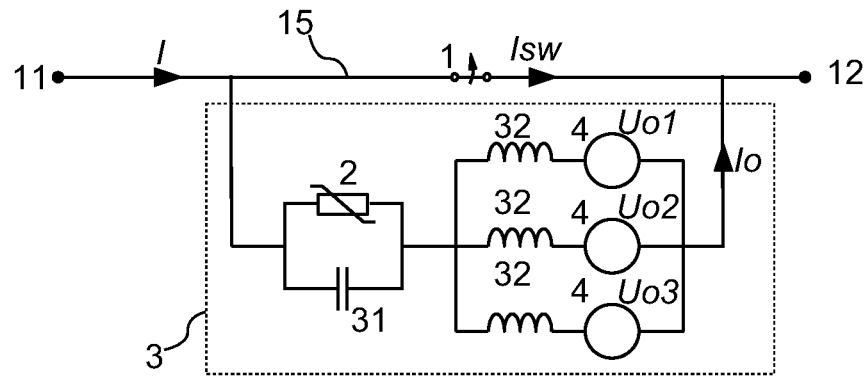

In a further embodiment, shown in FIG. 11, the two-pole 3 contains a capacitor 31 in series with a parallel-connection of several branches consisting a voltage control means 4 in series with an inductor 32. The inductors together with the capacitor form a resonant circuit that can be excited by the voltage control means 4. When the voltage control means 4 provide identical voltages the currents flowing through each of the parallel connected branches will be in phase and thus sum together to form a total resonant current Io with high amplitude AIo that permits interruption of currents with higher amplitude AI than would be possible with a single voltage control means.

Figure 12:
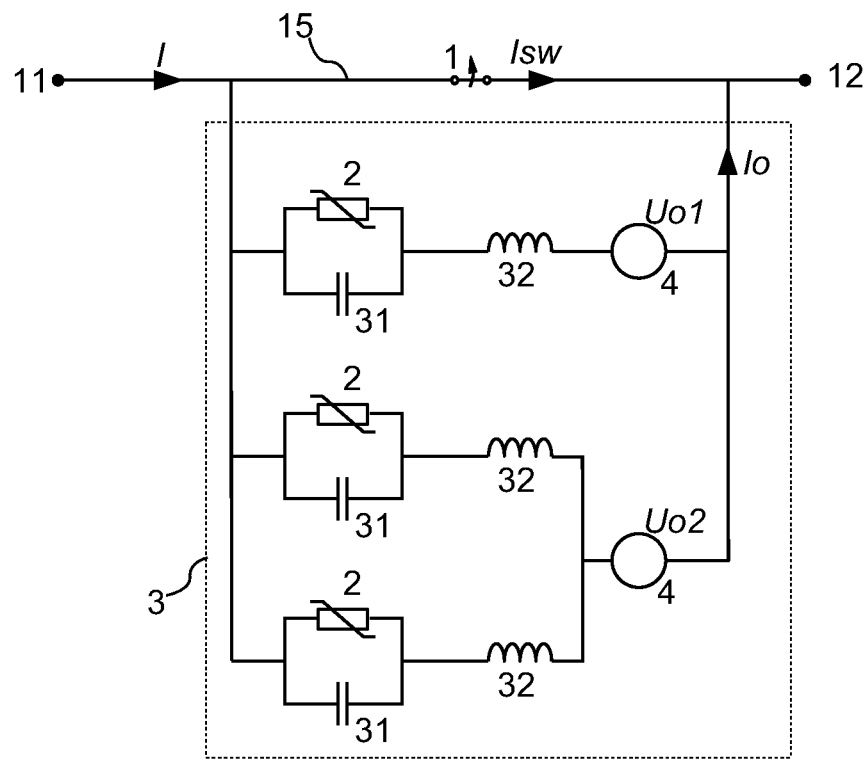

In a preferred embodiment the two-pole comprises at least two resonant circuits with identical or different frequencies as shown in FIG. 12. Their resonance frequencies, impedances and their respective starting time are selected in order to provide a total oscillating current with desired waveform to cause current zero-crossing of the current in the branch containing the mechanical main breaker 1.

Figure 14:
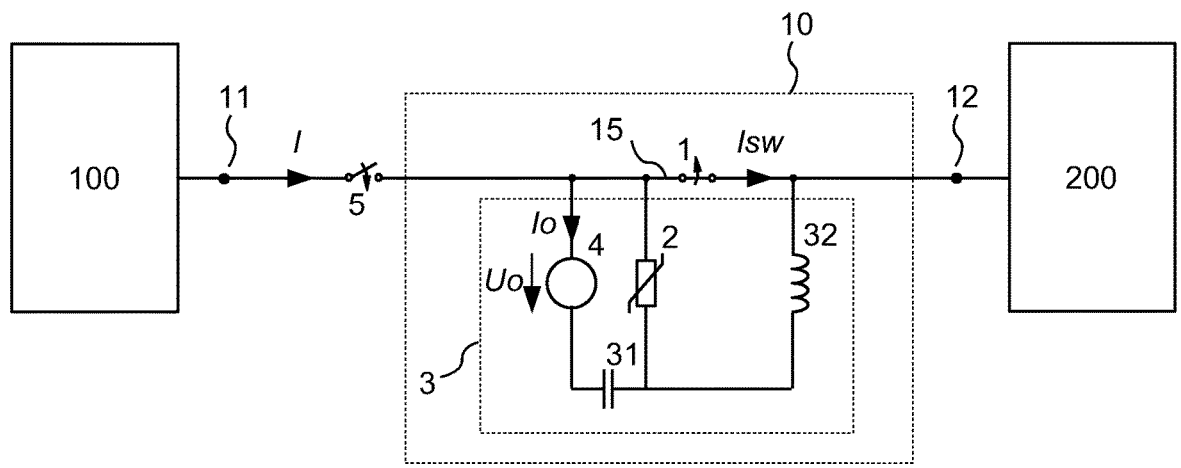
FIG. 14 shows an arrangement similar to the one of FIG. 5 but with a disconnecting switch connected in series.

In an alternative embodiment of an arrangement for interrupting current, a disconnecting switch 5 is connected in series with the interrupting arrangement 10 described with reference to FIG. 5. This arrangement is shown in FIG. 14.

When the main current I has been interrupted by the arrangement 10 the voltage limiting, energy absorbing device 2 in two-pole 3 does not conduct any current as the voltage between the terminals 11, 12 is lower than its protective voltage. Consequently the sections 100, 200 remain connected only through the two-pole 3. The latter contains a small series capacitor and therefore the disconnecting switch 5 can be opened without any sustained arcing. When open, the disconnecting switch 5 provides a physical separation in the electrical connection between the sections 100,200 of the power system.

In one scheme for operating the connection between the sections 100, 200 of the power system, the disconnector 5 is used to close the connection. In this case the capacitor(s) 31 in the two-pole 3 can be discharged once the disconnector 5 has been opened, and the main switch 1 can then be closed without any discharge pulse. The arrangement 10 thereby becomes ready to perform current interruption immediately at reclosing of the disconnector 5.

In another scheme for operating the connection between the sections 100, 200 of the power system the disconnecting switch 5 is closed before the mechanical main interrupter 1.

The controllable voltage control means 4 is preferably a static voltage source converter. It may be implemented in many ways using different types of semiconductors. FIGS. 15a-e depict a number of possible converter designs as examples of useful circuit topologies. Typically such a converter utilizes at least one dc link 41 (or 41a, 41b), which typically consists of a dc capacitor bank. The latter may be supplemented by batteries or any other dc voltage source. The dc link may be powered by any isolated auxiliary power supply, local dc generating device like e.g. fuel cells, photovoltaic cells or energy storage of any kind. The frequency of the output voltage of the converter preferably appears in the 5-25 kHz range. The dc link voltage, which determines the voltage rating of the semiconductors in the converter, is only a fraction of the protective voltage of the energy absorbing device 2. Note that series connection of several bridges with separate dc links can be utilized in order to achieve high output voltage without the need to use strings with direct series connection of semiconductor devices. The semiconductors and the dc link must be designed to withstand high peak operating currents or over-voltages or be equipped with adequate protective means.

Figure 15A:
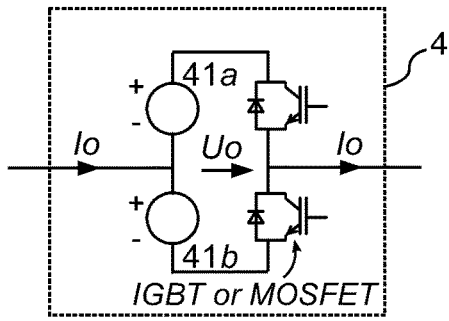
FIGS. 15a-e show different implementations of a power electronic converter.
Figure 15B:
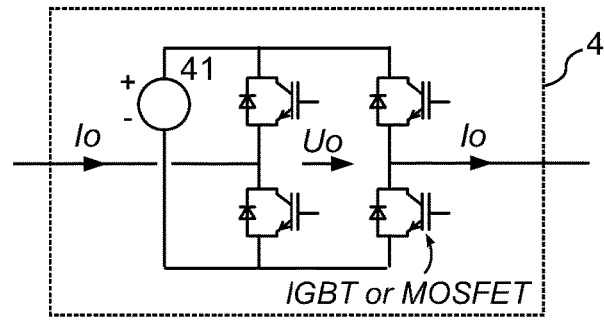
Figure 15C:
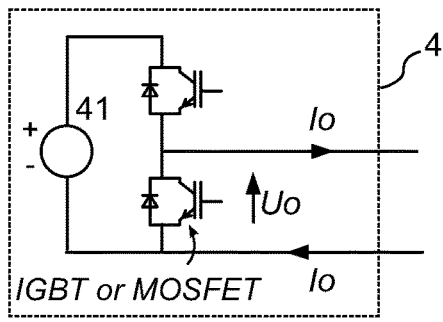
Figure 15D:
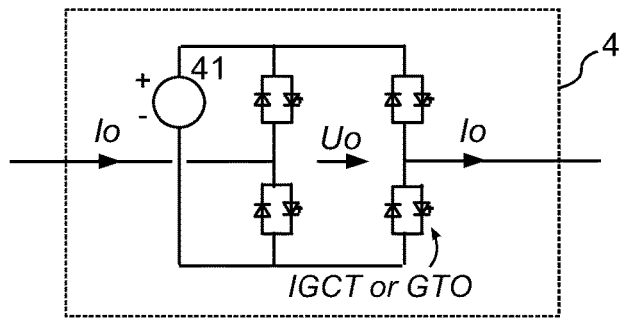
Figure 15E:
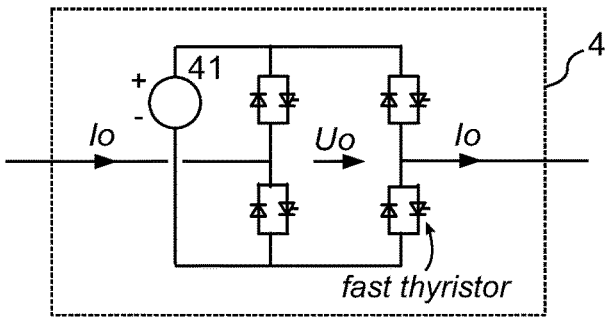

The circuits in FIGS. 15a-f use one or two half-bridge phase-legs. In FIGS. 15a and 15c only one half-bridge is used. Symmetrical output voltage (with both polarities) can be obtained, if the midpoints of the phase-leg and dc-link respectively are used as output terminals as shown in FIG. 15a, while unipolar voltage and zero voltage will be available when the midpoint of the phase leg and one of the dc link rails serve as output terminals as in FIG. 15c. If the converter is configured as an H-bridge using two phase-legs as in FIGS. 15b, 15d and 15e, it can produce output voltages with either polarity as well as zero voltage. In the topologies shown in FIGS. 15b-e, the oscillating current Io totally bypasses the dc link when the output voltage is zero.

If the semiconductor bridges are blocked, i.e. no active semiconductor devices are turned on, the oscillating current Io will pass through the diodes in the converter arms, charging the dc link. As a result the oscillating current will be suppressed by the opposing voltage, whose amplitude is determined by the voltage in the dc link 41 (or 41a, 41b).

Figure 16A:
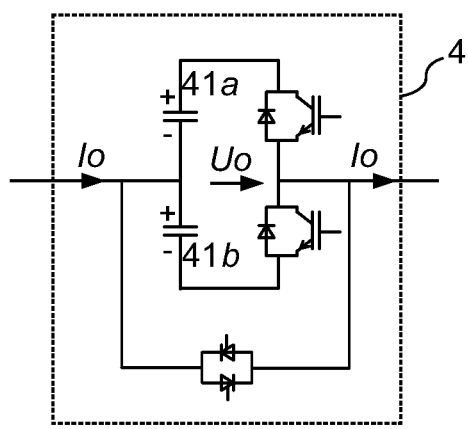
FIGS. 16a-b show examples of protective arrangements for a power electronic converter.
Figure 16B:
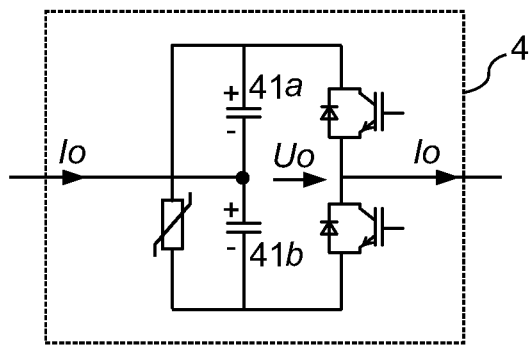

Examples of protective arrangements intended to protect the power electronic converter (semiconductor and dc-link) against surge current and over-voltage are shown in FIG. 16a and FIG. 16b respectively.

In FIGS. 15a-e, semiconductors of type MOSFET, IGBT, IGCT/GTO and thyristors have been indicated. The first three semiconductor families hold inherent current extinguishing capability and they can be switched close to the zero-crossing of the oscillating current through the static voltage source converter. The turn-on of the thyristor, on the other hand, must be delayed after that zero-crossing of the oscillating current in order to let its phase-leg companion thyristor recover after turning off.

Figure 17:
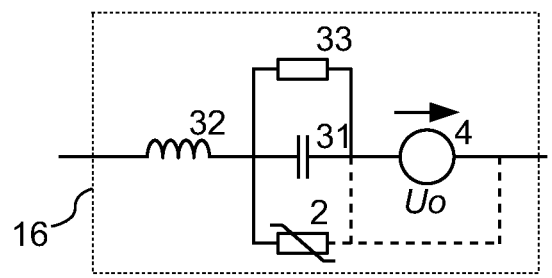
FIG. 17 shows a branch comprising a capacitor, an inductor, a voltage control means and an energy absorbing device, where the capacitor is equipped by a discharging means.

The oscillating current Io only exists during transitory periods whilst its amplitude AIo increases to exceed the magnitude AI of the main current I. It is appropriate if the capacitor voltage at any other time adapts to its average value, which is determined by the voltage across the main switch 1 and the voltage control means 4. This condition will be automatically achieved, if the capacitor 31 is equipped by a discharging means, e.g. by a linear or non-linear resistor 33 connected in parallel, see FIG. 17. Although the discharge time should be substantially longer than the time needed for excitation of Io, it can still be quite short, in the range down to five milliseconds. The arrangement is specifically advantageous, when the current interrupting arrangement includes a disconnecting switch 5. In this case the capacitor will be completely discharged so that the main switch 1 may reclose without any discharge current, thereby making the current interrupting arrangement 10 ready to interrupt the current I immediately, when the disconnecting switch 5 closes.

FIGS. 18a-c show different configurations of a branch comprising a capacitor, an inductor, a voltage control means and an energy absorbing device, where the capacitor is equipped by a discharging means.

Configurations of alternative means for discharging a capacitor are shown in FIGS. 19a-c.

The main switch 1 should have a fast mechanical actuating system making it possible to achieve contact separation within milliseconds. Preferably, vacuum switches are used, either a single switch or a string of series-connected devices. Due to the physics of their conduction mechanism they can extinguish very fast (sub-microsecond) at or even before the current zero-crossing. Moreover, the required mechanical stroke is short and the mass of the moving contact is small, when compared with other types of mechanical interrupters.

A series-connection of a medium-voltage vacuum switch and a high-voltage breaker of other type can also be utilized. The main switch may also be series-connected with a low-voltage power electronic switch.

Furthermore, the main switch 1 may be implemented by several series-connected mechanical switches, which are operated so that the contact separation instants of the individual switches are distributed in time. This procedure may be used to safeguard that sufficient voltage withstand capability has been reached in at least one individual mechanical switch, when the current Isw through the string of switches zero-crosses.

The controllable voltage means 4 shall be manipulated to control the amplitude of the oscillating current Io and to make zero-crossings in the current through the main switch 1 appear at adequate time instants, i.e. when the contact separation is sufficient to provide enough voltage handling capability. A good estimation of the contact separation as function of time can be achieved if one or more sensors for the instantaneous position, acceleration and/or velocity is provided.

A sensor detecting contact separation in the main switch 1 can contribute with adequate information to the control and monitoring system for the controllable voltage control means 4. Preferably, such a detector can be based on observation of any physical quantity that is related to the contact separation. Such phenomena are appearance of arcing voltage drop, acoustical phenomena, optical, thermal, X-ray or any other type of electromagnetic radiation or noise.

A sensor monitoring the conduction status of the mechanical main circuit breaker 1 can be used to provide information to the control system that governs the excitation of the oscillating current Io. The sensor may e.g. directly measure the voltage across the terminals of the mechanical main breaker 1 or the voltage across the energy absorbing device 2. Depending on the detected conduction status of the mechanical main breaker excitation of the oscillating current Io can be inhibited when the mechanical main breaker is in its non-conducting state.

If the state of the mechanical main breaker changes from non-conducting to conducting during a current interrupting operation the excitation of the oscillating current Io can be resumed.

Figure 20A:
FIGS. 20a-c show implementations of a voltage limiting, energy absorbing device.
Figure 20B:
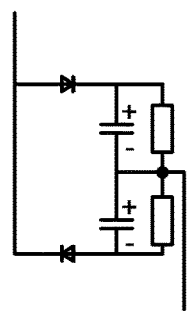
Figure 20C:

Preferably, the energy absorbing device 2 is a Metal Oxide Varistor (MOV), but alternatively other devices exhibiting resistance with similar strongly non-linear voltage dependence or a voltage-limiting arrangement can be used. Optionally a clamping circuit, consisting of a charged capacitor connected through diodes, may be used. Various implementations of the energy absorbing device 2 are shown in FIGS. 20*a-c*

Figure 21A:
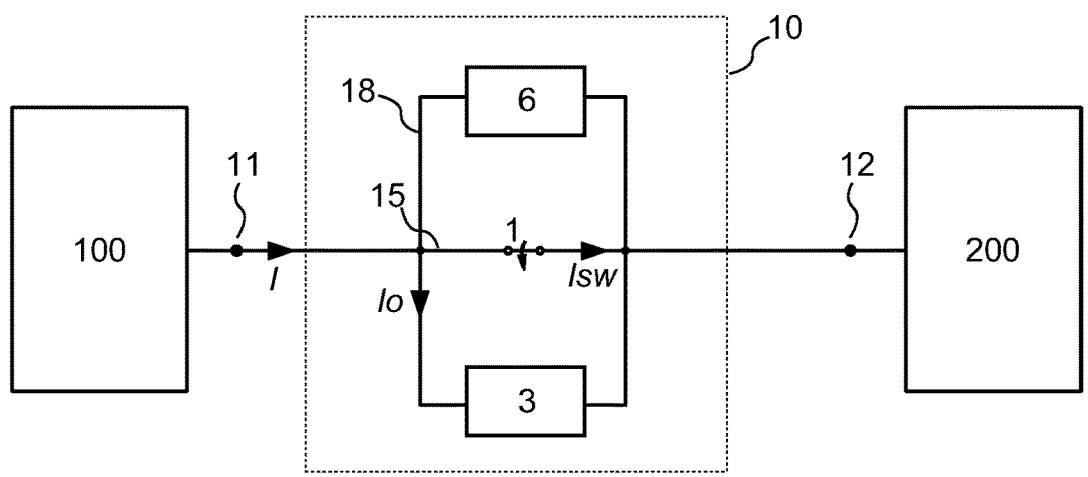
FIG. 21a-b shows an alternative embodiment of an arrangement for interrupting current having a branch for reverse current.

In an alternative embodiment of an arrangement for interrupting current according to the invention, an additional branch 18 has been added in parallel with the branch 15 containing the mechanical breaker 1 in the current interrupting arrangement 10, see FIG. 21*a*. The purpose of the added branch is to offer a conductive path for the reverse current, which arises when the currents I and Io have the same sign and the amplitude of the oscillating current AIo exceeds that of the main current AI. The control system acts to make this path conductive, in the direction opposite to the main current I, when the oscillating current Io is excited. The reverse current then commutates into branch 18 when contact separation is present and accordingly zero current passes through the mechanical switch 1, which then reestablishes its dielectric voltage withstand capability. When the oscillating current Io swings back, and the current through the branch 18 again zero-crosses, the two-pole 3 containing the at least one capacitor 31, the voltage control means 4 and the voltage-limiting energy-absorbing device 2 will be the only path that remains open for the main current I. The main current I charges the capacitor 31 until the voltage reaches the level where the voltage-limiting energy-absorbing device 2 starts to conduct. The protective voltage of device 2, which exceeds the source voltage amplitudes in sections 100,200 of the power system, then forces the main current I to zero.

Figure 21B:
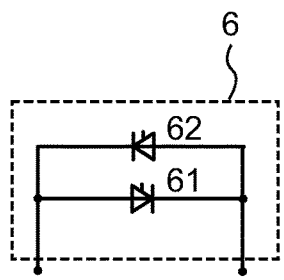

The branch 18 may comprise a circuit arrangement 6 constituted by two strings of unidirectional valves 61,62 connected in anti-parallel, see FIG. 21*b*. Each unidirectional valve comprises at least one thyristor. Alternatively strings of bidirectional thyristors with the same functionality can be utilized. In some applications current interrupting is only required for currents I having a determined direction. In such cases it might be possible to implement only the thyristor valve with the conduction direction opposite to the main current I.

Figure 22A:
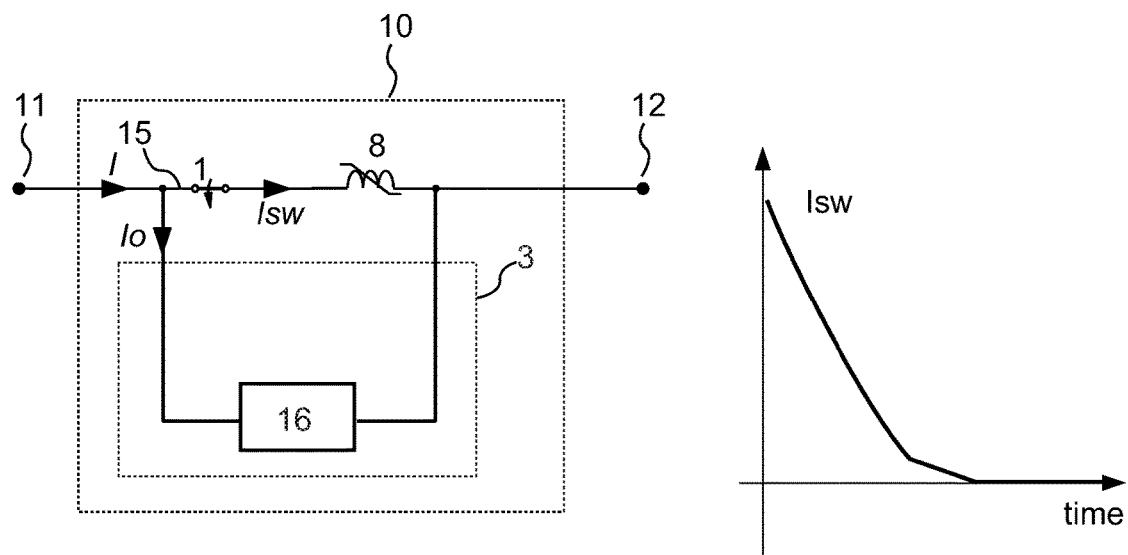
FIG. 22a-c shows an alternative embodiment of an arrangement for interrupting current having a saturable reactor.
Figure 22B:
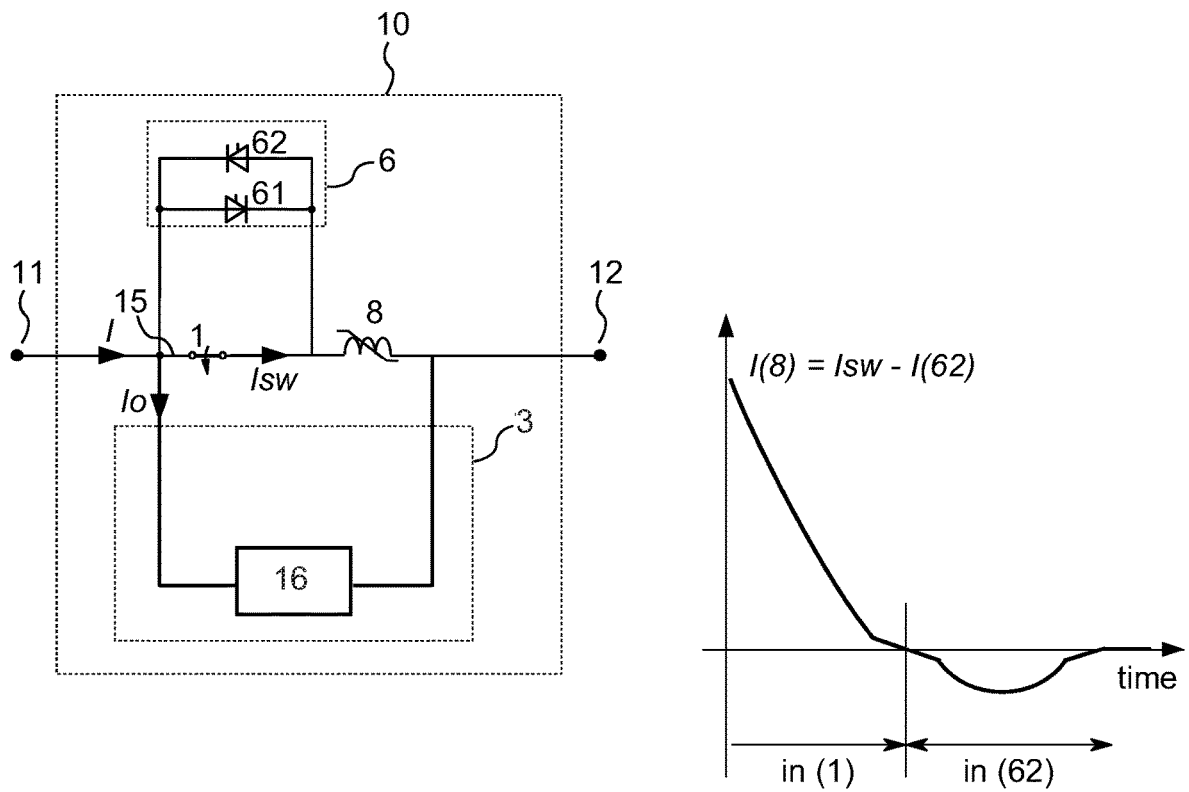
Figure 22C:
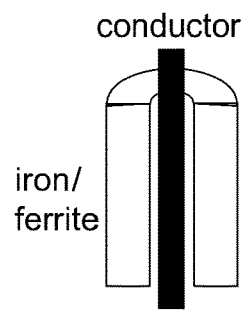

In an alternative embodiment of an arrangement for interrupting current according to the invention, the branch comprising the main switch 1 includes a saturable reactor 8 connected in series as shown in FIGS. 22*a-b*. FIG. 22*a* illustrates the arrangement 10 without branch 18 and FIG. 22*b* with branch 18 included. The purpose is to reduce the current derivative at zero-crossing, which is beneficial for certain mechanical breakers with respect to their voltage handling capability immediately after current interruption. The principle is clarified in the figure. The saturable reactor 8 may take the form of a, possibly air-gapped, magnetic core made of iron or ferrite that encloses a main conductor as shown in the sketch in FIG. 22*c*.

Figure 23:
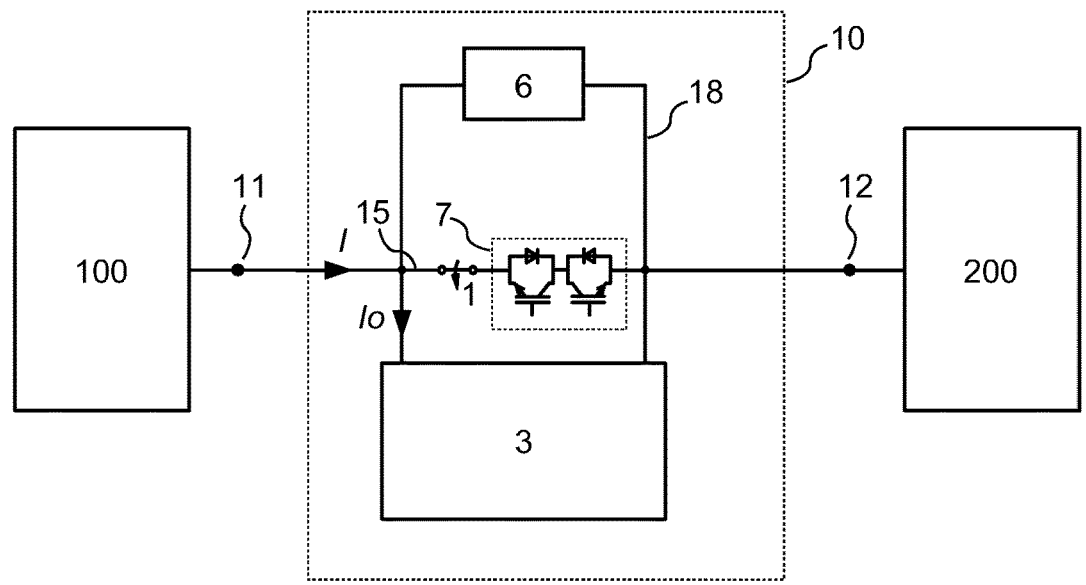
FIG. 23 shows an alternative embodiment of an arrangement for interrupting current comprising a low-voltage commutation semiconductor switch.

In order to ensure that the reverse current mentioned in the preceding section really commutates into the additional branch 18 (when provided) a low-voltage semiconductor switch 7 may be connected in series with the mechanical switch 1, see FIG. 23. The low-voltage switch 7 can be controlled only to allow current directed as the main current I to flow, blocking current in the reverse direction. It should be controlled in coordination with the control of the valves 61, 62 in branch 18.

Figure 24:
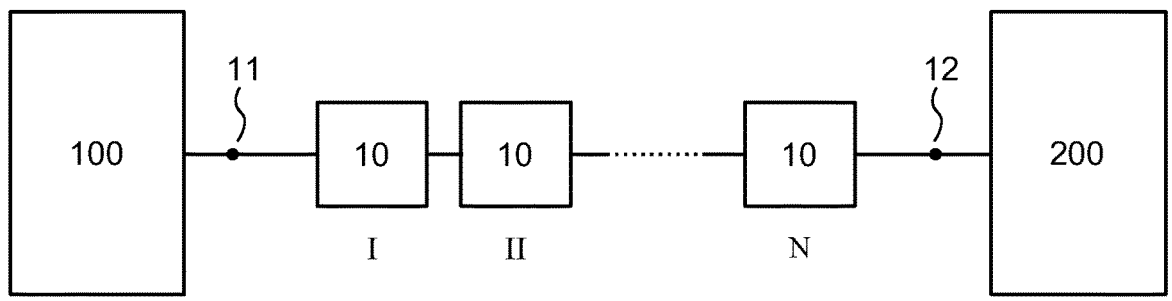
FIG. 24 shows a system for interrupting current according to the invention, comprising several arrangements for interrupting current.

Several current interrupting arrangements 10, described above, may be arranged in series between the sections 100,200 in the power system as shown in FIG. 24. By closing/opening the main switches 1 in the arrangements 10, a varying number of voltage-limiting energy-absorbing devices 2 can be inserted in the connection between the sections 100, 200 of the power system, in order to limit fault current flowing through the interconnection. As large amounts of energy will be accumulated in these devices it is only possible to maintain such operational conditions for a short time, maximum tens of milliseconds. This time however may be sufficient to limit the short-circuit current in a grid during the time required for determining which breakers in the system that shall operate at a specific disturbance.

A method to control the interrupting arrangement 10 described above will now be described. To execute this method, a control system is required to coordinate the opening of the mechanical switch 1 and the excitation of the total oscillating current Io by controlling the voltage control means 4 in the two-pole 3.

The opening of the mechanical switch 1 simply starts by giving the "OPEN" command to the mechanical actuator, which starts to transfer the moving contact away from the fixed contact so that contact separation occurs. The mechanical delay time, tmech, i.e. the time elapsing from the "OPEN" command is given until contact separation has been established, is normally known with good accuracy, and it can be used by the control system. Although the mechanical delay time, in the range 1-5 ms, appears to be very short from the mechanical point of view, it still is quite long from a power electronic perspective. Note e.g. that ten full cycles at 10 kHz will be completed during one millisecond, see FIGS. 25*a-b*, showing the principle of buildup of oscillating current amplitude in the resonant circuit constituted by the parallel connection of branch 15 and the two-pole 3 by the action of the fast controllable power electronic voltage control means 4. Consider the LC-circuit illustrated in FIG. 25*a*. The circuit is characterized by its resonance frequency $$f_{osc} = \frac{1}{2\pi\sqrt{L_{osc}C_{osc}}}$$

and its reactance $$x_0 = \sqrt{\frac{L_{osc}}{C_{osc}}}$$

(at the resonance frequency). The circuit is excited by a voltage control means which can be assumed to produce voltage of both polarities. The amplitude of the applied voltage is Uosc and its direction is controlled by power electronic means to follow the direction of the current Io. The ratio between the applied voltage amplitude Uosc and the characteristic reactance $x_0$ defines a unit current, which can be denoted Iosc $$I_{osc} = \frac{U_{osc}}{x_0}$$

Initially the voltage control means produces a constant output voltage Uosc, which is blocked by the series capacitor Cosc. When the excitation is activated an output voltage reversal will be performed and accordingly a voltage step with amplitude 2×Uosc is applied on the resonance circuit. Following this first reversal of the output voltage a sinusoidal current half-cycle with amplitude 2×Iosc will be created if losses are neglected. Its peak occurs after a quarter-cycle of the resonance frequency. When the current zero-crosses after a full half-cycle a new reversal is imposed and the amplitude of the oscillating current increases to 4× Iosc. Similarly at each zero-crossing of the oscillating current its amplitude increases with 2×Iosc. Accordingly, one quarter-cycle after N reversals (half-cycles) the amplitude of the oscillating current ideally is 2×N×Iosc. After three and a quarter cycles, i.e. after seven reversals, the amplitude of the oscillating current ideally is 14×Iosc.

Note that a substantial increase of the oscillating current amplitude is obtained in very short time. Consider e.g. a case where a current of 10 kA shall be interrupted with a protective voltage of 100 kV. An LC-circuit with characteristic reactance of x0=8Ω may be used in such a case. Taking losses into consideration the amplitude of the oscillating current after four cycles is about 14×Iosc and it will exceed 10 kA with 10% if Iosc=1.1×10/14=0.79 kA. The required dc link voltage is Uosc=x0×Iosc=8×0.79=6.3 kV, which is only 6.3% of the protective voltage. Moreover, the time to reach this amplitude is only four cycles, i.e. 400 µs at 10 kHz, which is substantially shorter than the mechanical delay time, tmech. The voltage rating of each semiconductor in a power electronic converter using full-bridges becomes Uosc, i.e. 6.3% of the protective voltage. In the full-bridge four arms are needed so that the total voltage rating of all semiconductors becomes 25% of the protective voltage.

This example indicates that the current interrupting arrangement 10 according to this invention allows a substantial reduction of the amount of semiconductor devices when compared to other known arrangements that typically require that semiconductors rated for the full protective voltage with both polarities should be used.

Figure 26:
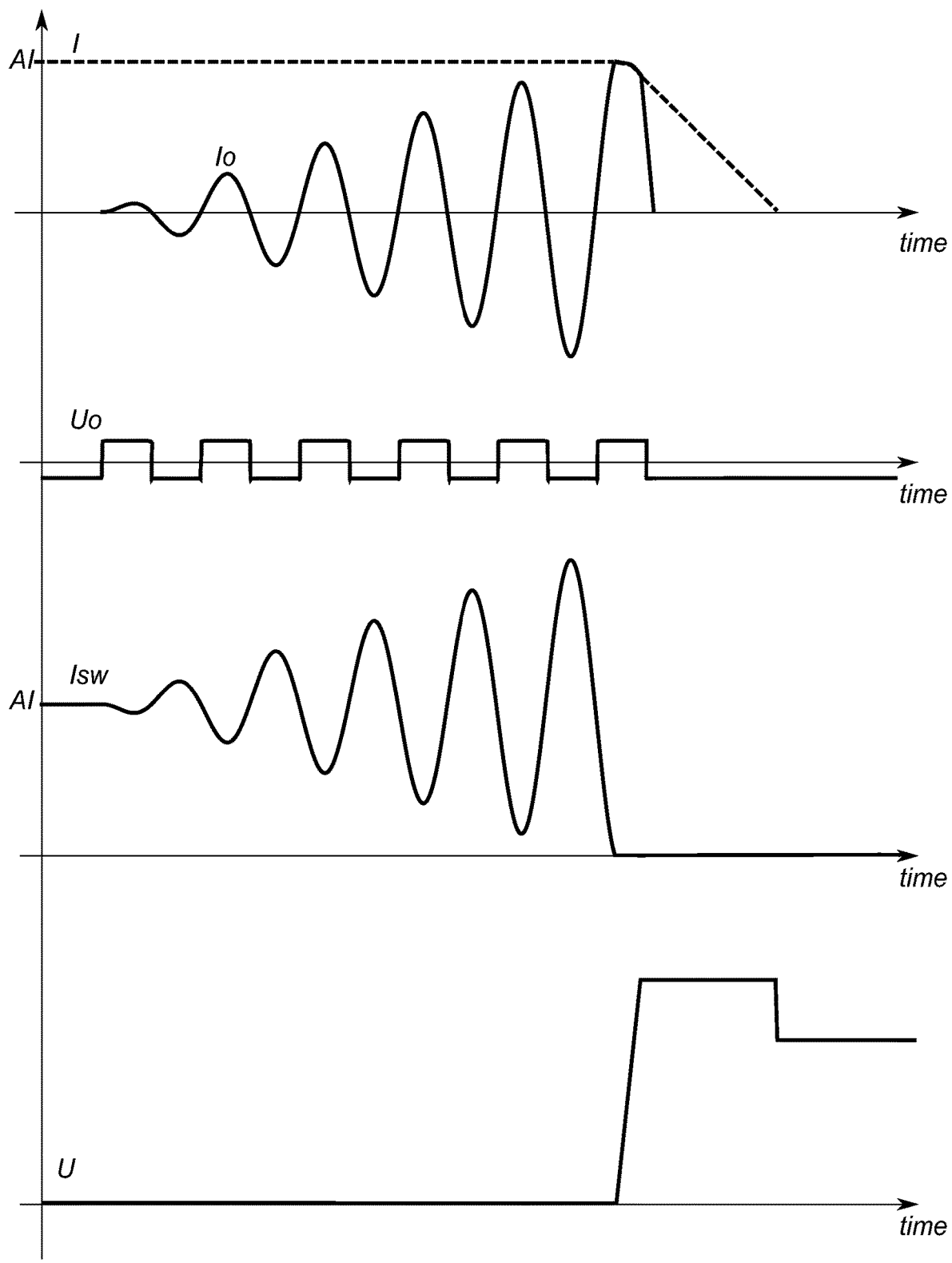
FIG. 26 shows principal waveforms at current interruption.

FIG. 26 shows the course of the current interruption operation as described above. Typically, the current interruption occurs, when the total oscillation current Io has the same direction as the main current I and the amplitude of the oscillating current AIo exceeds the amplitude of the main current AI. Then the voltage across the main switch 1 experiences a linear voltage change, when the main current I charges the capacitor(s) 31 in the two-pole 3 until the voltage across the voltage-limiting energy-absorbing device(s) 2 reach(es) the protective voltage of the latter and it takes over the main current.

When the current interrupting arrangement 10 includes an additional branch 18, the "reverse" current, i.e. excess current Isw=Io−I that occurs when, during the interrupt operation, the oscillating current Io and the main current I have the same direction and the amplitude of the oscillating current Io exceeds the amplitude of the main current I, will be carried by that branch 18. Current interruption then occurs when the amplitude of the oscillation current Io decreases. A linear increase of the voltage(s) across the capacitor(s) in the two-pole 3 results until it reaches the protective voltage in the corresponding energy-absorbing device 2.

Preferably, coordinated control of the opening of the mechanical switch 1 and the excitation of the oscillating current Io is provided in order to perform successful current interruption of the main current I.

When a disconnecting switch 5 is provided, reverse conducting means 6, or an auxiliary low-voltage switch 7 assisting the commutation of the main current I to the reverse conducting means 61,62, the control of the corresponding switches could preferably be included in the coordinated control scheme.

The sequence of the execution of the steps is preferably predefined such that zero-crossings in the current Isw, passing through the mechanical breaker 1, occur when sufficient dielectric isolation strength to withstand the voltage limit of the energy absorbing device 2 in the two-pole 3 has been built up in the breaker after contact separation.

Figure 27:
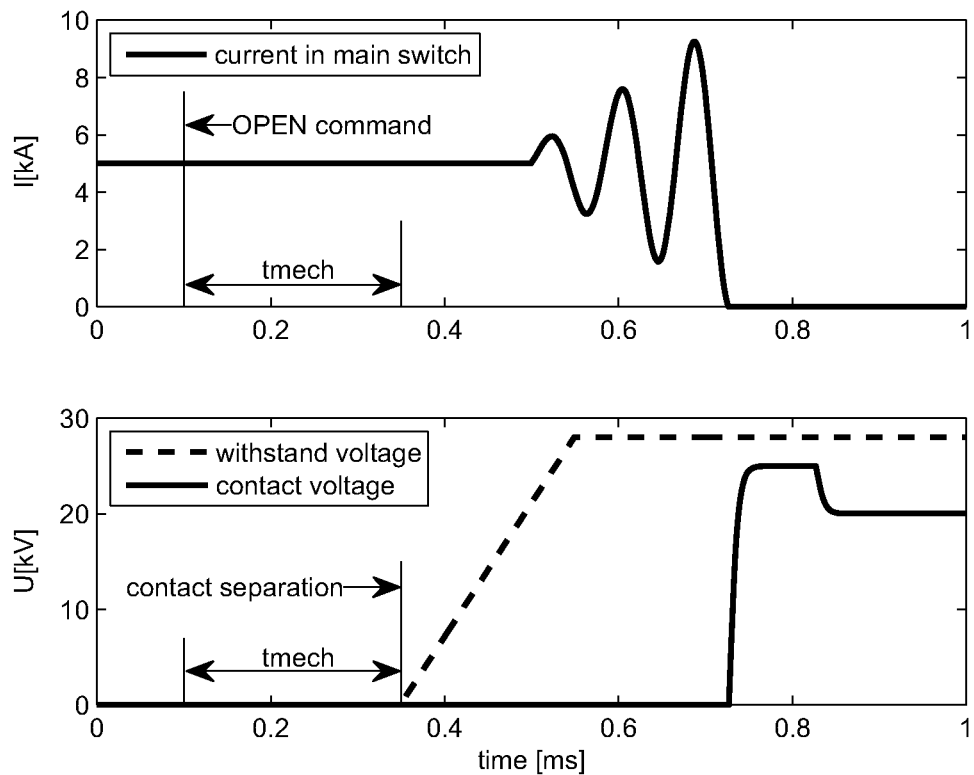
FIG. 27 illustrates current zero-crossing versus voltage withstand capability.

The coordination of the steps of control aims to secure that sufficient contact separation in order to provide enough voltage withstand capability in the mechanical switch 1 has been established, when the zero-crossing in the current passing through the mechanical switch 1 is created by the oscillating current Io, as illustrated in FIG. 27.

Figure 28:
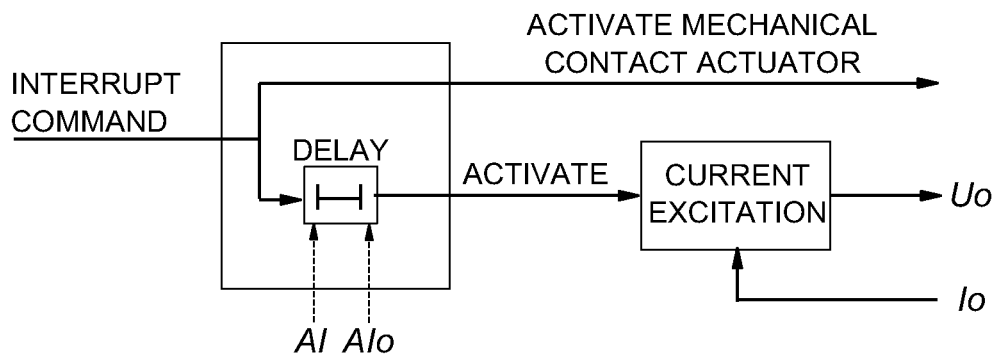
FIGS. 28 and 29 illustrate some examples of signal control.

Often the mechanical delay time is well defined and known, and the course of the excitation of the oscillating current is well controlled. If this is the case the signals given to the switches are preferably given in a defined time sequence based on time-delays with reference to the command to open the mechanical switch 1, as shown in FIG. 28. The time delay may be varied in dependence of the measured value of the main current I.

Figure 29:
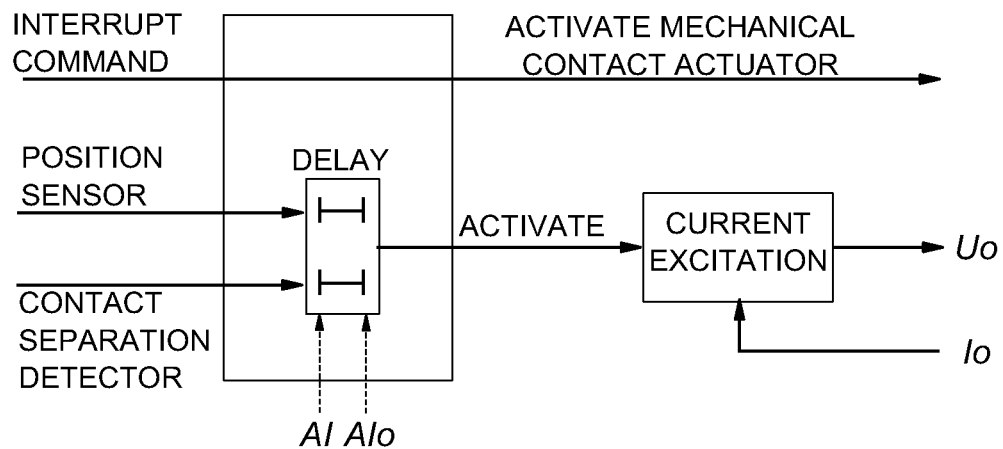

Preferably, the signals given to the switches are determined in dependence of signals from any sensor detecting that contact separation has occurred or indicating the position of the moving contact during the opening operation. Optionally fixed time delays can be used or variable time delays which depend on measured values of the main current I and/or the oscillating current Io or sensed value of the moving contact velocity. Some examples are shown in FIG. 29.

Preferably the conduction state of the mechanical breaker 1 is monitored by a sensor, which sends information to the system that governs the excitation of the oscillating current. Typically the excitation stops when the mechanical breaker is in its non-conducting state but restarts if a voltage breakdown occurs during a current interruption operation and the mechanical breaker falls back into its conducting state.

If the time to excite the oscillating current amplitude AIo to exceed the main current level AI is longer than the mechanical delay time, tmech, it may be advantageous to start the excitation as soon as the main current I exceeds a lower level than the normal trip level, maintaining the amplitude of the oscillating current close to the amplitude of the main current I awaiting the final decision to execute current interruption, in which case the mechanical switch is commanded to operate and the amplitude of the oscillating current is controlled to exceed the main current amplitude AI, or not to complete the current interruption, in which case the excitation of the oscillating current will be inhibited. The amplitude of the oscillating current may be maintained at a more or less constant level by inhibiting selected commutations in the voltage control means 4.

Situations occur where several current interrupting arrangements 10 have been connected in series with the aim to limit the main current I passing between the sections 100, 200 in the power system. Typically such installations may be of interest in dc grids interconnecting several HVDC stations. Such dc grids may contain a number of dc breakers and it is important that, at a fault in the grid, only the relevant dc breaker is operated. The proper selection may require some time, in the order of a few milliseconds. During that time insertion of a controllable number of current interrupting arrangements 10 makes it possible to prevent further increase of the main current I.

Figure 30:
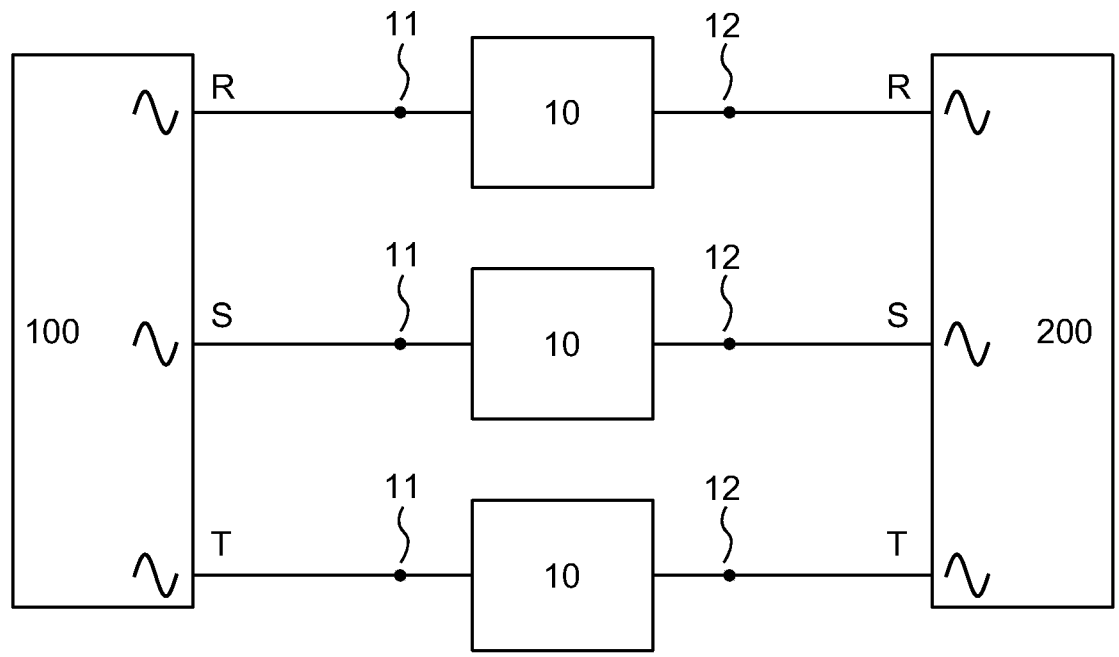
FIGS. 30 and 31a-b show alternative configurations of a branch of an arrangement for interrupting current according to the invention.
Figure 31A:
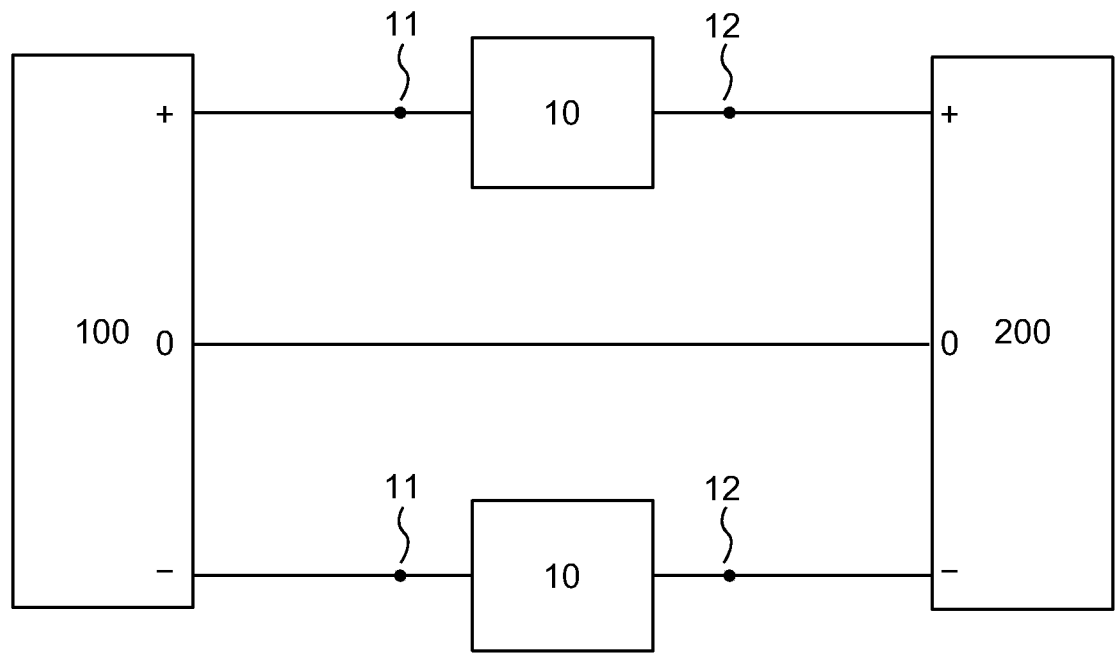
Figure 31B:
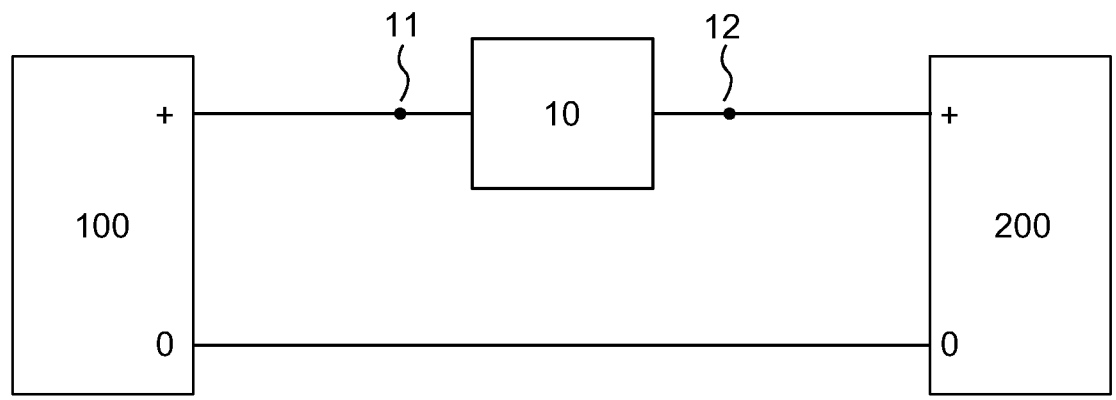

The arrangement for interrupting current according to the invention can be used in different power network configurations, of which three are illustrated in FIG. 30, showing an ac power network, and FIG. 31a-b, showing dc power networks.

Preferred embodiments of an arrangement, a system, and a method for interrupting current according to the invention have been given. It will be appreciated that these may be varied within the scope of the appended claims without departing from the inventive idea.

The invention claimed is:

1. An arrangement for interrupting current comprising a first and a second terminal being adapted to electrically connect two sections of a power system, and comprising at least a main branch containing a mechanical breaker through which a main current (I) between the terminals can flow when the main circuit breaker is closed, and a two-pole, connected in parallel with said main branch, said two-pole comprising at least one two-pole branch containing a capacitor and an energy absorbing device, where the main branch and the two-pole together form a loop, that contains an inductance and a voltage control means, and wherein the loop exhibits at least one resonance frequency, wherein
    said voltage control means being controllable in use to inject energy into said loop to force a rapid increase of an alternating current (Io) flowing through said main branch while it is being controlled to open the main breaker to interrupt the main current (I), and whereby zero cross-over of the current (Isw) through the mechanical main circuit breaker is realized as the amplitude (AIo) of the alternating current (Io) exceeds the amplitude (AI) of the main current,
    said energy absorbing device is adapted to limit the voltage across said capacitor and across said mechanical breaker when the mechanical breaker is open, and
    said energy absorbing device is adapted to limit the voltage across said inductive element if the voltage across the mechanical breaker breaks down, at or immediately after an opening process, thereby limiting the rate-of-rise and the peak of the current through said loop.

2. The arrangement for interrupting current according to claim 1, wherein said two-pole comprises a parallel-connection of at least two two-pole branches.

3. The arrangement for interrupting current according to claim 1, wherein at least one two-pole branch comprises at least one capacitor, at least one inductor and one voltage control means, all connected in series, and additionally at least one energy absorbing voltage limiting device connected in parallel with said capacitor.

4. The arrangement for interrupting current according to claim 1, wherein at least one two-pole branch comprises at least one capacitor, at least one inductor and one voltage control means, all connected in series, and additionally at least one energy absorbing voltage limiting device connected in parallel with a series-connection of said capacitor and said voltage control means.

5. The arrangement for interrupting current according to claim 1, wherein the terminals are connected to points where the main branch and the two-pole are joined on either side of the main breaker.

6. The arrangement for interrupting current according to claim 1, comprising an over-voltage reducing circuit connected between terminals of the mechanical breaker.

7. The arrangement for interrupting current according to claim 6, wherein the over-voltage reducing circuit is a series-connection comprising at least one resistor and at least one capacitor.

8. The arrangement for interrupting current according to claim 1, comprising at least one disconnecting switch arranged in series connection with at least one of the first and second terminals, and being controllable in use to provide a physical separation of the two sections of a power system.

9. The arrangement for interrupting current according to claim 1, wherein the at least one voltage control means is a static voltage source converter.

10. The arrangement for interrupting current according claim 1, wherein the capacitor is provided with a discharging means.

11. The arrangement for interrupting current according to claim 1, wherein the mechanical breaker comprises a contact adapted to move during the opening process of the mechanical breaker, and wherein the mechanical breaker comprises at least one sensor.

12. The arrangement for interrupting current according to claim 11, wherein said at least one sensor is adapted in use to determine at least one of the position, the acceleration and the velocity of the contact during the opening process of the mechanical breaker.

13. The arrangement for interrupting current according to claim 11, wherein said at least one sensor is adapted to detect a physical quantity.

14. The arrangement for interrupting current according to claim 1, wherein the two-pole comprises a plurality of two-pole branches with different resonance frequencies, whereby the loop exhibits several resonance frequencies.

15. The arrangement for interrupting current according to claim 1, wherein the main branch further comprises a saturable reactor arranged in series with the mechanical breaker to help reduce the rate of change of current in the proximity of the zero cross-over of the current through the mechanical breaker.

16. The arrangement for interrupting current according to claim 1, further comprising an additional circuit branch arranged in parallel with the main branch and the two-pole, said additional circuit branch being provided with a reverse current control means to, during a current interruption, provide an alternative path for reverse current (Io-I) away from the mechanical breaker.

17. The arrangement for interrupting current according to claim 16, wherein the reverse current control means comprises two thyristors arranged in anti-parallel to control current flow through said two thyristors in opposite directions.

18. The arrangement for interrupting current according to claim 16 wherein the main branch further comprises a low-voltage semiconductor switch arranged in series with the mechanical breaker, the low-voltage semiconductor being controllable in use to help divert the current from the mechanical breaker to the additional circuit branch.

19. The arrangement for interrupting current according to claim 1, wherein the arrangement for interrupting current is a dc breaker.

20. The arrangement for interrupting current according to claim 1, wherein the arrangement for interrupting current is a current limiting ac breaker.

21. A system for interrupting current comprising at least two arrangements for interrupting current according to claim 1, wherein said at least two arrangements for interrupting current are connected in series.

22. A method of interrupting current in a power system using an arrangement for interrupting current to claim 1, the method comprising the steps of:
opening the mechanical breaker to facilitate the separation of the contacts of the mechanical breaker and to interrupt a main current (I) having an amplitude (AI), and
controlling the voltage control means in the two-pole to excite a total oscillating current (Io) having a maximum amplitude (AIo) higher than the amplitude (AI) of the interrupted main current (I), to cause current zero-crossing in the main branch.

23. The method of interrupting current in a power system according to claim 22, wherein the waveform of the exciting voltage control means is designed, with respect to the filter characteristic of the loop, to provide an oscillating current having desired waveform to cause current zero-crossing in the branch containing the breaker.

24. The method of interrupting current in a power system according to claim 22, wherein the number of two-pole branches, their resonance frequencies and their respective starting time are selected in order to provide a total oscillating current with desired waveform to cause current zero-crossing in the branch containing the breaker.

25. The method of interrupting current according to claim 22, wherein the steps of opening the mechanical circuit breaker and controlling the voltage control means are performed concurrently and in coordination.

26. The method of interrupting current according to claim 22, wherein the sequence of the execution of the steps is predefined such that the zero-crossings in the current passing through the mechanical breaker occur at suitable time instants with respect to the dielectric isolation strength that is built up in the breaker, when the contacts separate from each other.

27. The method of interrupting current according to claim 22, wherein the sequence of steps is executed with predefined time delays between the consecutive steps, and wherein the time delays are constants or varied dependent on the amplitude of the main current to be interrupted.

28. The method of interrupting current according to claim 27, wherein the predefined time delays between consecutive steps are selected so that the contact separation distance of the mechanical breaker is sufficient to withstand the voltage limit of the energy absorbing device of the second parallel branch in a minimum total time.

29. The method of interrupting current according to claim 25, wherein a sensor is used to determine the time delays between the steps.

30. The method of interrupting current according to claim 22, wherein the execution of one or several of the steps is conditional, so that an oscillating current, which has such amplitude that zero-crossings occur in the current (Isw) flowing through the mechanical interrupter, is excited and maintained, until a decision is taken, either to execute the complete sequence of steps to interrupt the main current (I), or not to complete the interruption, in which case the oscillating current will be suppressed.

* * * * *